(12) United States Patent
Yamasaki et al.

(10) Patent No.: US 9,777,241 B2
(45) Date of Patent: Oct. 3, 2017

(54) COMPOSITION FOR SLIDING MEMBER

(71) Applicant: NOK Klueber Co., Ltd., Tokyo (JP)

(72) Inventors: Yujiro Yamasaki, Ibaraki (JP); Masaki Tahara, Ibaraki (JP)

(73) Assignee: NOK KLUEBER CO., LTD., Tokyo (JP)

( * ) Notice: Subject to any disclaimer, the term of this patent is extended or adjusted under 35 U.S.C. 154(b) by 0 days.

(21) Appl. No.: 14/379,309

(22) PCT Filed: Mar. 1, 2013

(86) PCT No.: PCT/JP2013/055676
§ 371 (c)(1),
(2) Date: Aug. 18, 2014

(87) PCT Pub. No.: WO2013/168453
PCT Pub. Date: Nov. 14, 2013

(65) Prior Publication Data
US 2015/0057199 A1  Feb. 26, 2015

(30) Foreign Application Priority Data

May 7, 2012 (JP) ................................. 2012-105846

(51) Int. Cl.
*F16C 33/20* (2006.01)
*F16C 33/04* (2006.01)
*C10M 177/00* (2006.01)
*C07F 7/08* (2006.01)
*C10M 157/10* (2006.01)
*C10M 145/20* (2006.01)
*C10M 149/18* (2006.01)
*C10M 107/38* (2006.01)
*C08L 101/00* (2006.01)
*F04B 27/08* (2006.01)
*F01B 3/00* (2006.01)
*C08L 77/00* (2006.01)
*C08L 79/08* (2006.01)
*C10M 169/04* (2006.01)
*F02F 3/00* (2006.01)
*F04B 39/00* (2006.01)
*C08G 77/14* (2006.01)
*C08G 73/14* (2006.01)

(52) U.S. Cl.
CPC ........... *C10M 157/10* (2013.01); *C08L 77/00* (2013.01); *C08L 79/08* (2013.01); *C08L 101/00* (2013.01); *C10M 107/38* (2013.01); *C10M 145/20* (2013.01); *C10M 149/18* (2013.01); *C10M 169/041* (2013.01); *F01B 3/0085* (2013.01); *F04B 27/086* (2013.01); *F04B 27/0886* (2013.01); *F04B 27/0895* (2013.01); *C08G 73/14* (2013.01); *C08G 77/14* (2013.01); *C10M 2209/1013* (2013.01); *C10M 2213/062* (2013.01); *C10M 2217/0443* (2013.01); *C10M 2229/0475* (2013.01); *C10N 2230/06* (2013.01); *C10N 2240/02* (2013.01); *C10N 2250/18* (2013.01); *F02F 3/00* (2013.01); *F04B 39/00* (2013.01); *F05C 2251/14* (2013.01); *F05C 2253/12* (2013.01); *F05C 2253/20* (2013.01)

(58) Field of Classification Search
CPC .......... F16C 33/201; C10M 2213/062; C10M 2227/04
USPC ................................ 508/100, 107, 181, 207
See application file for complete search history.

(56) References Cited

U.S. PATENT DOCUMENTS

| | | | | |
|---|---|---|---|---|
| 5,789,354 A | * | 8/1998 | Mikami | ............... C10M 111/04 508/107 |
| 2011/0031664 A1 | | 2/2011 | Nakamura et al. | |
| 2012/0149611 A1 | * | 6/2012 | Yamaguchi et al. | .......... 508/107 |
| 2012/0308168 A1 | | 12/2012 | Watanabe et al. | |

FOREIGN PATENT DOCUMENTS

| | | |
|---|---|---|
| JP | S62-138588 A | 6/1987 |
| JP | S62-246621 A | 10/1987 |
| JP | S63-162771 A | 7/1988 |
| JP | H01-161608 A | 6/1989 |
| JP | 2000-074136 A | 3/2000 |
| JP | 3208130 B | 9/2001 |
| JP | 2002-275485 A | 9/2002 |
| JP | 2002286039 A | 10/2002 |
| JP | 2003-253214 A | 9/2003 |
| JP | 2005325182 A | 11/2005 |
| JP | 2006-016561 A | 1/2006 |
| JP | 2006152169 A | 6/2006 |
| JP | 2009-068390 A | 4/2009 |
| JP | 4319724 B | 8/2009 |
| JP | 2011-179566 A | 9/2011 |
| WO | 2010/038746 A | 4/2010 |

OTHER PUBLICATIONS

English translation of Written Opinion for PCT/JP2013/055676 dated Jun. 4, 2013.
English translation of International Preliminary Report on Patentability dated Nov. 11, 2014 for PCT/JP2013/055676.
International Search Report and Written Opinion issued on Jun. 4, 2013 for PCT/JP2013/055676.
Office Action dated Dec. 9, 2015 from corresponding Chinese Patent Application No. 201380003158.8.
Office Action received on Dec. 14, 2015 for corresponding Japanese Patent Application No. 2012-105846.
Office Action dated Aug. 3, 2016 in a counterpart Chinese application 201380003158.8.
Extended European Search Report dated Apr. 28, 2016 in a counterpart European Application No. 13788582.8.

(Continued)

Primary Examiner — Vishal Vasisth
(74) Attorney, Agent, or Firm — Thompson Coburn LLP

(57) ABSTRACT

A composition for sliding member includes a binder resin, a solid lubricant, and an epoxy modified silicone oil having an epoxy group at both ends or at one end thereof. A weight ratio of the binder resin and the epoxy modified silicone oil is 97:3 to 75:25.

5 Claims, No Drawings

(56) References Cited

OTHER PUBLICATIONS

Office Action dated Mar. 28, 2016 in a counterpart Japanese application No. 2012-105846.
Office Action dated Jul. 25, 2016 in a counterpart Japanese application No. 2012-105846.
Decision to Grant dated Feb. 13, 2017 in a counterpart Japanese application No. 2012-105846.
Decision to Grant dated Feb. 3, 2017 in a counterpart Chinese application No. 201380003158.8.

* cited by examiner

COMPOSITION FOR SLIDING MEMBER

CROSS-REFERENCE TO RELATED APPLICATIONS

This is the U.S. National Stage of International Application No. PCT/JP2013/055676, filed Mar. 1, 2013, which claims the benefit of Japanese Patent Application No. 2012-105846, filed May 7, 2012, the disclosures of which are hereby incorporated by reference in their entireties.

TECHNICAL FIELD

The present disclosure relates to a composition for sliding member, and more specifically relates to a composition for sliding member that shows less wear even in a severe sliding environment of, for example, a half dry state.

BACKGROUND ART

A sliding environment in a half dry state often exists in a sliding portion in a compressor such as an air conditioner and a sliding portion near a piston of an automobile engine, and specifically includes, in a swash plate-type compressor, a sliding portion between a piston rod and a swash plate that drives the piston rod.

In the related art, a sliding member is known that has a coating film formed on a surface thereof, the coating film being formed of a composition obtained by blending a solid lubricant such as polytetrafluoroethylene, graphite and molybdenum disulfide in a binder resin such as a polyimide resin or a polyamide-imide resin. However, there is a trade-off between a lubricity of the coating film provided by blending the solid lubricant and a mechanical strength and adhesion to a member of the coating film, and when it is attempted to improve the lubricity, the strength and the adhesion will decrease. Therefore, it was difficult to achieve both of the above properties.

Depending on the use, the properties can be achieved by optimizing a blending amount of the solid lubricant to balance between the coating film strength and the lubricity. However, with only a solid lubricant of the related art, the decrease of a friction coefficient is limited. It is possible to decrease both a static friction coefficient and a dynamic friction coefficient by applying a lubricating oil agent such as grease or oil to a sliding surface. However, since the lubricating oil agent will be discharged from sliding surfaces in a short period of time due to the sliding, the lubricity cannot be maintained. Also, since solidification or deterioration occurs with time, there is a problem that a friction coefficient will increase.

A lubricating coating may be, for example, a baking coating in which silicone having a functional group at both ends is blended in a thermosetting resin composition (patent document 1), a lubricating coating including a polyamide-imide resin, a reactive silicone oil having an epoxy group, and triazinethiol (patent document 2), a composition in which lubricant is retained in a cavity part of a porous resin film (patent document 3), and a material containing a curable resin, a solid lubricant and a modified silicone oil (patent document 4).

DOCUMENT LIST

Patent Document(s)

Patent Document 1: Japanese Laid-Open Patent Publication No. S63-162771

Patent Document 2: Japanese Patent No. 4319724
Patent Document 3: Japanese Patent No. 3208130
Patent Document 4: Japanese Laid-Open Patent Publication No. 2002-275485

SUMMARY OF DISCLOSURE

Technical Problem

However, according to patent document 1, the amount of modified silicone blended into a coating is very little, and thus lubricity is not sufficient. According to patent document 2, a reactive silicone oil is cross-linked by triazinethiol and has a three-dimensional network structure. Accordingly, the silicone oil solidifies, loses fluidity, and has a reduced lubricity. The porous resin film of patent document 3 has a reduced adhesiveness and wear resistance, and wear is occurred over a short period of time due to the sliding. According to patent document 4, since a modified silicone having an epoxy group and a polyether group in a side chain is contained, solidification occurs by baking and fluidity will be lost. Wear resistance is also not sufficient.

It is an object of the present disclosure to provide a composition for sliding member having a lubricity and wear resistance.

Solution to Problem

In order to solve the aforementioned problem, the present inventors provide a composition for sliding member as described below.

(1) A composition for sliding member including a binder resin, a solid lubricant, and an epoxy modified silicone oil having an epoxy group at both ends or at one end thereof, a weight ratio of the binder resin and the epoxy modified silicone oil being 97:3 to 75:25.
(2) The composition for sliding member according to (1), wherein the binder resin is at least one resin selected from a polyamide-imide resin, a polyamide resin, a polyimide resin, an epoxy resin and a phenol resin.
(3) The composition for sliding member according to (1) or (2), wherein the solid lubricant is polytetrafluoroethylene.
(4) A sliding member having a coating film formed on a surface thereof, the coating film being formed of the composition for sliding member of any one of claims (1) to (3).

Advantageous Effects of Disclosure

The composition for sliding member of the present disclosure has an improved lubricity and wear resistance.

DESCRIPTION OF THE PREFERRED EMBODIMENTS

Hereinafter, the present disclosure will be described in detail in accordance with an embodiment.

(Composition for Sliding Member)

A composition for sliding member of the present disclosure includes a binder resin, a solid lubricant, and an epoxy modified silicone oil having an epoxy group at both ends or at one end. Various additives are blended as necessary.

(Silicone Oil)

The silicone oil has an epoxy group at both ends or at one end. Specifically, it is an epoxy modified silicone oil in which a functional group containing an epoxy group substitutes for methyl groups at both ends or one end of dimethylpolysiloxane. As for the functional group containing an epoxy group, a functional group may be, for example, an alkyl group or ether.

The blending ratio of the silicone oil to the composition for sliding member of the present disclosure is not particularly limited. However, considering a lubricity, a wear resistance, and a strength of coating film, it is preferably 1 to 24% by weight, and more preferably, 3 to 19% by weight.

(Binder Resins)

The binder resin is not particularly limited. However, for example, a thermosetting resin such as a polyamide-imide resin, a polyamide resin, a polyimide resin, an epoxy resin and a phenol resin may be used. These binder resins may be used alone or in combination.

The polyamide-imide resin is, for example, obtained by condensation polymerization of tricarboxylic anhydride and diamine or condensation polymerization of tricarboxylic anhydride and diisocyanate. Tricarboxylic anhydride specifically includes aromatic tricarboxylic anhydride such as anhydrous trimerit acid. Diamine may be, specifically, aromatic diamine such as m-phenylenediamine, p-phenylenediamine, 3,3'-diaminodiphenylmethane, 4,4'-diaminodiphenylether, and 4,4'-diaminodiphenylmethane. Diisocyanate may be, specifically, aromatic diisocyanates such as 4,4'-diphenylmethanediisocyanate, 3,3'-diphenylmethanediisocyanate, 4,4'-diphenyletherdiisocyanate, 3,3'-diphenyletherdiisocyanate, and paraphenylenediisocyanate.

The polyamide resin is obtained by, for example, ring-opening of lactam or condensation polymerization of diamine and dicarboxylic acid. Lactam may be, specifically, 2-pyrrolidone, caprolactam, and laurolactam. Diamine may be, specifically, an aliphatic diamine such as hexamethylenediamine and pentamethylenediamine. Dicarboxylic acid may be, specifically, adipic acid, malonic acid, succinic acid, glutaric acid, pimelic acid, suberic acid, azelaic acid, sebacic acid, dodecanedicarboxylic acid, dimethylmalonic acid, 3,3-diethylsuccinic acid, 2,2-dimethylglutaric acid, 2-methyladipic acid, trimethyladipic acid, 1,3-cyclopentanedicarboxylic acid, 1,4-cyclohexanedicarboxylic acid, terephthalic acid, isophthalic acid, and 2,6-naphthalenedicarboxylic acid.

The polyimide resin is, for example, obtained by condensation polymerization of tetracarboxylic anhydride and diamine. Tetracarboxylic anhydride may be, specifically, aliphatic tetracarboxylic dianhydride such as 1,2,4,5-cyclohexanetetracarboxylic dianhydride, 1,2,3,4-butanetetracarboxylic dianhydride, 1,2,3,4-cyclobutanetetracarboxylic dianhydride, and aromatic tetracarboxylic dianhydride such as pyromellitic dianhydride, 3,3',4,4'-biphenyltetracarboxylic dianhydride, and 2,3,3',4'-biphenyltetracarboxylic dianhydride.

The epoxy resin may be, for example, bisphenol epoxy resin, novolac epoxy resin, naphthalene epoxy resin, fluorene epoxy resin, triphenylmethane epoxy resin, glycidyl ether epoxy resin, glycidyl ester epoxy resin, and glycidylamine epoxy resin.

The phenol resin is, for example, obtained by condensation polymerization of phenols and aldehydes. The phenols may be, specifically, phenol, resorcin, cresol and xylenol. The aldehydes may be, specifically, formaldehyde and furfural.

The blending ratio of the binder resin in the composition for sliding member of the present disclosure is not particularly limited, but considering the adhesiveness with the base material and a strength of the coating film, blending ratio is preferably 30% to 92% by weight, and more preferably, 56% to 90% by weight.

The weight ratio between the binder resin and the silicone oil in the composition for sliding member of the present disclosure is from 97:3 to 75:25, and preferably from 95:5 to 80:20. When the weight ratio of the silicone oil is less than 3%, properties such as lubricity and wear resistance that are properties of the silicone oil are not obtained. When it is greater than 25%, each component of the composition will easily separate, and a uniform coating film is not obtained.

(Solid Lubricant)

The solid lubricant is preferably particles of a fluorine-based resin. For example, it is polytetrafluoroethylene, a tetrafluoroethylene-perfluoroalkylvinylether copolymer, a tetrafluoroethylene-hexafluoropropylene copolymer, tetrafluoroethylene-ethylene copolymer, polyvinylidene fluororide, and trichlorotrifluoroethylene.

Particle size of the solid lubricant is not particularly limited, but considering dispersion stability in the coating and ease of coating, it is preferably less than or equal to 30 μm, and more preferably, 0.2 to 20 μm.

The blending ratio of the solid lubricant in the composition for sliding member of the present disclosure is not particularly limited. However, considering the lubricity, wear resistance, and the strength of the coating film, it is preferably 5% to 60% by weight, and more preferably 5% to 30% by weight.

(Solvent)

The composition for sliding member of the present disclosure may include a solvent. The solvent is not particularly limited, but may be, for example, N-methyl-2-pyrrolidone, N,N-dimethylformamide, xylene, methylethylketone, and methylisobutylketone. These solvents may be use alone or in combination.

(Various Additives)

The composition for sliding member of the present disclosure may be further blended with additives such as a coloring agent, an antifoaming agent, a surface active agent and other lubricant, as needed. These additives may be use alone or in combination.

The coloring agent may be, for example, red oxide, zinc oxide, titanium oxide, aniline black, cadmium yellow, yellow iron oxide, titanium yellow, insoluble disazo yellow, azo condensation yellow, isoindolinone yellow, benzimidazolone yellow, insoluble disazo orange, benzimidazolone orange, perinone orange, cadmium red, monoazo lake red, insoluble monoazo red, benzimidazolone red, azo condensation red, quinacridone red, perylene red, anthraquinonyl red, quinacridone violet, dioxazine violet, cobalt blue, ultramarine blue, phthalocyanine blue, insoluble disazo blue, indanthrone blue, titanium cobalt green, chlorinated phthalocyanine green, brominated phthalocyanine green, benzimidazolone brown, and aluminum.

The antifoaming agent may be, for example, dimethylpolysiloxane, polyacrylic acid, metal soap, fatty acid ester and phosphate ester.

Other lubricant may be, for example, molybdenum disulfide, carbon black, graphite, boron nitride, silane nitride, and melamine cyanurate.

The composition for sliding member of the present disclosure has lubricity and wear resistance by containing an epoxy modified silicone oil having an epoxy group at both ends or one end. Since an epoxy group exists in dimethylpolysiloxane, compatibility with a binder resin improves. Further, since an epoxy group only substitutes at an end, the composition exists in a fluid state in a coating film and since the composition is provided on a sliding surface, lubricity improve and wear resistant can also be improved. On the other hand, in a case where an epoxy group substitutes in a side chain, since the baking causes solidification and a loss in fluidity, lubricity and wear resistance are poor.

(Process for Preparing Composition for Sliding Member)

The composition for sliding member of the present disclosure is not particularly limited, but may be a composition that is preferably obtained by mixing and dispersing a predetermined amount of a binder resin, a solid lubricant, an epoxy modified silicone oil, other additives and solvents using an appropriate combination of a stirrer such as a dissolver, a ball mill, a sand mill, and an agi homo mixer.

(Sliding Member)

A coating film can be formed on a surface of a sliding member by applying a composition for sliding member of the present disclosure to a sliding member. An application method to the sliding member is not particularly limited, but may be a spray method, a dipping method, a flow coat method, a dispenser method, and a spin coating method. Depending on each application method, a viscosity can be adjusted by a solvent at the time of production of a lubricating coating composition or before application.

After the application of the composition for sliding member to a sliding member, the solvent evaporates in a dry baking step. Then, a coating film is formed on a surface of the sliding member. The drying temperature is appropriately adjusted depending on the type of the resin, and it is usually performed at 60 to 120° C. The film thickness after the drying is 15 to 100 µm. Then, baking is performed at a high-temperature. The baking temperature is adjusted appropriately depending on a type of the resin, and it is usually performed at 150 to 300° C. A film thickness after the baking is 10 to 80 µm. After the baking, the sliding member is cooled, and may be adjusted by grinding depending on the purpose.

The sliding member of the present disclosure is used as a sliding member for a compressor of an air conditioner, an engine piston of an automobile, a solenoid valve for gas and liquid, a plunger, a valve, a bush or a slide bearing.

EXAMPLES

Preparation of Composition for Sliding Member

Binder resin: Polyamide-imide (PAI) resin HPC-5012-32 (manufactured by Hitachi Chemical Co., Ltd.)
Solid lubricant: Polytetrafluoroethylene (PTFE) Fluon L173J (manufactured by Asahi Glass Co., Ltd.)
Silicone oil: As indicated in Table 1 below:
Solvent: Combined solvent of N-methyl-2-pyrrolidone and methylisobutylketone

TABLE 1

|  | PRODUCT NAME (MANUFACTURED BY SHIN-ETSU CHEMICAL CO., LTD) | VISCOSITY ($m^2$/sec) | FUNCTIONAL GROUP EQUIVALENT (g/mol) |
|---|---|---|---|
| NO SUBSTITUTION | KF-96-100cst | 100 | — |
| EPOXY GROUP IN SIDE CHAIN | KF-101 | 1500 | 350 |
| EPOXY GROUP AT BOTH ENDS | X-22-163C | 120 | 2700 |
| EPOXY GROUP AT ONE END | X-22-173DX | 65 | 4500 |

The binder resin, the solid lubricant and the silicone oil were added to the solvent at a blending ratio of Table 2 and mixed and dispersed by a ball mill (Examples 1 to 4 and Comparative Examples 1 to 5). The obtained dispersion liquid was applied to a test piece (material: SAPH440 disc) as a sliding member by spraying. It was coated such that a film thickness after the baking becomes 30 to 50 µm and baked at 200 to 230° C. After the baking, adjustment using an abrasive paper was carried out until the film thickness reached 20 µm. Polishing was carried out using abrasive papers of progressively finer grades so as to be in the range of roughness of Rz [DIN]=1.0±0.5 µm. An evaluation result of the composition for sliding member is shown in Table 2.

[Test and Evaluation of Composition for Sliding Member]

Friction and Wear Characteristics

A pin-on-disc type testing machine (3 pin type) was used. A counterpart material pin used is made of iron (SUJ-2) and has a size of φ5 mm×10 mm. Similarly to the disc, a roughness of a sliding surface of the pin was adjusted. The pin was placed on the adjusted disc and set in a test sliding part. A load of 200N was applied from above and the disc was rotated at a speed of peripheral-speed of 2 m/s. A test hour for a single test was one hour and repeated for three times. A wear depth of the disc sliding surface after the test was evaluated as a quantity of wear.

Surface Condition Observation

By visual inspection and touching, it was checked whether oil component did not bleed out on a coating film surface after the baking.

TABLE 2

|  |  | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|---|---|---|
| PAI RESIN (wt. %) | | 67.5 | 71.3 | 67.5 | 60 | 67.5 | 67.5 | 73.5 | 52.5 | 75 |
| PTFE (wt. %) | | 25 | 25 | 25 | 25 | 25 | 25 | 25 | 25 | 25 |
| SILICONE OIL (wt. %) | NO SUBSTITUTION | | | | | | | 7.5 | | |
| | EPOXY GROUP IN SIDE CHAIN | | | | | 7.5 | | | | |
| | EPOXY GROUP AT BOTH ENDS | 7.5 | | | | | | | | |
| | EPOXY GROUP AT ONE END | | 3.7 | 7.5 | 15 | | | | 1.5 | 22.5 |
| PAI RESIN:SILICONE OIL | | 90:10 | 95:5 | 90:10 | 80:20 | 90:10 | 90:10 | 98:2 | 70:30 | |
| FRICTION/WEAR CHARACTERISTICS EVALUATION: WEAR DEPTH (µm) | | 0.7 | 1.0 | 0.4 | 0.6 | SEIZURE | 0.7 | 2.1 | — | 2.2 |

TABLE 2-continued

| | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|---|---|
| SURFACE CONDITION OBSERVATION EVALUATION: VISUAL, TOUCH | GOOD | GOOD | GOOD | GOOD | GOOD | OIL BLEED | GOOD | — | GOOD |

With a composition of Comparative Example 5 including a binder resin and a solid lubricant only, a depth of wear becomes greater. To the contrary, with compositions of Examples 1 to 4 containing the epoxy modified silicone oil having an epoxy group at one end or at both ends, it was found that the wear depth is smaller and has an improved wear resistance, and that an oil component does not bleed out on a coating film surface. On the other hand, with a composition of Comparative Example 1 including an epoxy modified silicone oil having an epoxy group in a side chain, it was found that the wear becomes deeper and seizure occurs. With a composition of Comparative Example 2 including a silicone oil with no substituent group, there was much bleed out after the baking. With a composition of Comparative Example 3 in which a smaller amount of silicone oil was blended, it was found that no wear resistant effect was obtained. With a composition of Comparative Example 4 in which a larger amount of silicone oil was blended, the composition separated after having mixed and dispersed each component and it was not able to obtain a uniform coating film.

From the foregoing, the coating film formed of the composition for sliding member of the present disclosure has wear resistance and lubricity. Particularly, according to the present disclosure, since an epoxy group only substitutes at an end, the composition of the present disclosure exists in a fluid state in a coating film and since the composition is provided on a sliding surface, lubricity is improved and wear resistant can also be improved. When an epoxy group is substituted in a side chain, the baking causes solidification and a loss in fluidity. Therefore, lubricity and wear resistance are not improved.

The invention claimed is:

1. A composition for a sliding member comprising:
a binder resin;
a solid lubricant; and
an epoxy modified silicone oil having an epoxy group at least at one end thereof,
wherein the weight ratio of the binder resin to the epoxy modified silicone oil is from 95:5 to 80:20,
wherein the binder resin is a polyamide-imide resin, and
wherein the blending ratio of the binder resin in the composition is 56% to 90% by weight.

2. The composition for a sliding member according to claim 1, wherein the solid lubricant is polytetrafluoroethylene.

3. A sliding member having a coating film on a surface thereof, the coating film comprising the composition of claim 1.

4. The composition for a sliding member according to claim 1, wherein the epoxy modified silicone oil has an epoxy group at both ends thereof.

5. The composition for a sliding member according to claim 1, wherein the epoxy modified silicone oil has an epoxy group at only one end thereof.

* * * * *